US012682689B2

(12) United States Patent
Horner

(10) Patent No.: US 12,682,689 B2
(45) Date of Patent: Jul. 14, 2026

(54) SYSTEM AND METHOD FOR PREDICTIVE MAINTENANCE BASED ON STEERING ANGLE DATA IN VEHICLES

(71) Applicant: International Truck Intellectual Property Company, LLC, Lisle, IL (US)

(72) Inventor: David Philip Horner, Aurora, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 77 days.

(21) Appl. No.: 18/583,396

(22) Filed: Feb. 21, 2024

(65) Prior Publication Data

US 2025/0265870 A1 Aug. 21, 2025

(51) Int. Cl.
*G07C 5/00* (2006.01)
*G07C 5/08* (2006.01)

(52) U.S. Cl.
CPC ........... *G07C 5/006* (2013.01); *G07C 5/0808* (2013.01)

(58) Field of Classification Search
CPC .............................. G07C 5/006; G07C 5/0808
See application file for complete search history.

(56) References Cited

U.S. PATENT DOCUMENTS

| | | | | |
|---|---|---|---|---|
| 6,313,742 | B1 | 11/2001 | Larson | |
| 6,427,101 | B1 | 7/2002 | Diaz et al. | |
| 6,554,183 | B1 * | 4/2003 | Sticha | G06Q 10/0875 705/29 |
| 7,535,347 | B2 | 5/2009 | Larson et al. | |
| 7,706,938 | B2 | 4/2010 | Palladino | |
| 9,052,996 | B2 * | 6/2015 | Wittliff, III | G07C 5/0808 |
| 2007/0233345 | A1 * | 10/2007 | Endo | B62D 5/049 701/41 |
| 2008/0269977 | A1 | 10/2008 | Palladino | |
| 2013/0282229 | A1 * | 10/2013 | Wittliff, III | G07C 5/0808 701/33.2 |
| 2014/0074345 | A1 * | 3/2014 | Gabay | G07C 5/008 701/33.9 |
| 2017/0113696 | A1 * | 4/2017 | Oh | G06V 20/588 |
| 2018/0260876 | A1 * | 9/2018 | Graham | H04L 9/32 |
| 2019/0225202 | A1 | 7/2019 | Juzswik | |
| 2020/0172164 | A1 * | 6/2020 | Mitsumoto | B62D 15/021 |
| 2021/0061027 | A1 | 3/2021 | Da Deppo et al. | |
| 2021/0191401 | A1 * | 6/2021 | Sinyavskiy | G05D 1/027 |
| 2021/0245778 | A1 * | 8/2021 | Suzuki | B60W 50/06 |
| 2022/0289317 | A1 | 9/2022 | Dieter et al. | |
| 2022/0348187 | A1 * | 11/2022 | Melkote | B62D 15/023 |
| 2022/0348256 | A1 * | 11/2022 | Melkote | B60W 50/0205 |
| 2023/0001915 | A1 * | 1/2023 | Bosse | B60W 30/045 |
| 2023/0001934 | A1 * | 1/2023 | Bosse | B60W 30/045 |
| 2024/0086948 | A1 * | 3/2024 | Bruchhardt | G06Q 30/0202 |

FOREIGN PATENT DOCUMENTS

| | | |
|---|---|---|
| GB | 2439416 A | 12/2007 |

* cited by examiner

*Primary Examiner* — Jess Whittington
(74) *Attorney, Agent, or Firm* — Umang Khanna

(57) ABSTRACT

Method and system for predictive maintenance are provided. In some aspects, a method includes receiving sensor data acquired using at least one sensor disposed on a vehicle, the sensor data comprising steering angle data, and using the steering angle data, determining a predictive maintenance indicator (PMI) for at least one component on the vehicle. The method also includes initiating a predictive maintenance for the at least one component on the vehicle based on the PMI.

9 Claims, 4 Drawing Sheets

SYSTEM AND METHOD FOR PREDICTIVE MAINTENANCE BASED ON STEERING ANGLE DATA IN VEHICLES

FIELD

The present disclosure generally relates to vehicle technologies. More particularly, the present disclosure relates to systems and method for predictive maintenance.

BACKGROUND

Many modern vehicles, machines, and equipment contain systems and components that can wear over time and affect performance or safety. For example, wear or failure of one or more steering, brake, axle, or suspension system or component on a vehicle may lead to operator fatigue, downtime, higher costs, risk of accident, and so forth. In many cases, an operator may be first to identify or responsible for reporting issues of a vehicle, machine, or equipment based on perceived symptoms. However, such reporting may often be subjective, and hard to quantify. Further, issue report subjectiveness may lead to a variety of misdiagnoses, and can result in longer downtime, return visits, increased expense, premature or incorrect component replacement, and so forth.

Therefore, there is a need for improved technologies for predictive maintenance.

SUMMARY

A method for predictive maintenance is also provided. In one embodiment, the method includes steps of receiving sensor data acquired using at least one sensor disposed on a vehicle, the sensor data comprising steering angle data, and using the steering angle data, determining a predictive maintenance indicator (PMI) for at least one component on the vehicle. The method also includes steps of initiating a predictive maintenance for the at least one component on the vehicle based on the PMI.

A system for predictive maintenance is provided. In one embodiment, the system includes input hardware operably coupled to at least one sensor disposed on a vehicle to receive sensor data acquired by the at least one sensor, the sensor data comprising steering angle data. The system also includes at least one processor connected to the input hardware, wherein the at least one processor receives steering angle data from the input hardware, and using the steering angle data, determines a predictive maintenance indicator (PMI) for at least one component on the vehicle. The at least one processor also generates, based on the PMI, a report to initiate a predictive maintenance for at least one component on the vehicle. The system further includes output hardware that communicates the report to a receiver.

BRIEF DESCRIPTION OF THE DRAWINGS

The present disclosure describes various embodiments with reference to the accompanying figures, wherein like reference numerals denote like elements. The embodiments described are presented by way of example, and not by way of limitation, in the accompanying drawings.

DETAILED DESCRIPTION

Wear of one or more component or system in a vehicle, machine, or equipment can be dependent on design as well as unique circumstances, such as usage, environmental conditions, quality variations, and so on. Timely and accurate detection of reduced performance or issues with a component or system can help reduce misdiagnosis, downtime, costs, and so forth. Unlike conventional approaches, the present disclosure recognizes a need for an objective, data-driven approach to maintenance. Therefore, a technical solution is provided herein that relies on predictive maintenance. As appreciated from description below, the present approach provides a number of benefits and improves a number of technologies, such as vehicle technologies, manufacturing technologies, and many others. For example, the present approach provides actionable data and information that can help avoid catastrophic failures or premature wear, mitigate against unplanned downtime events, and so forth.

Figure 1:
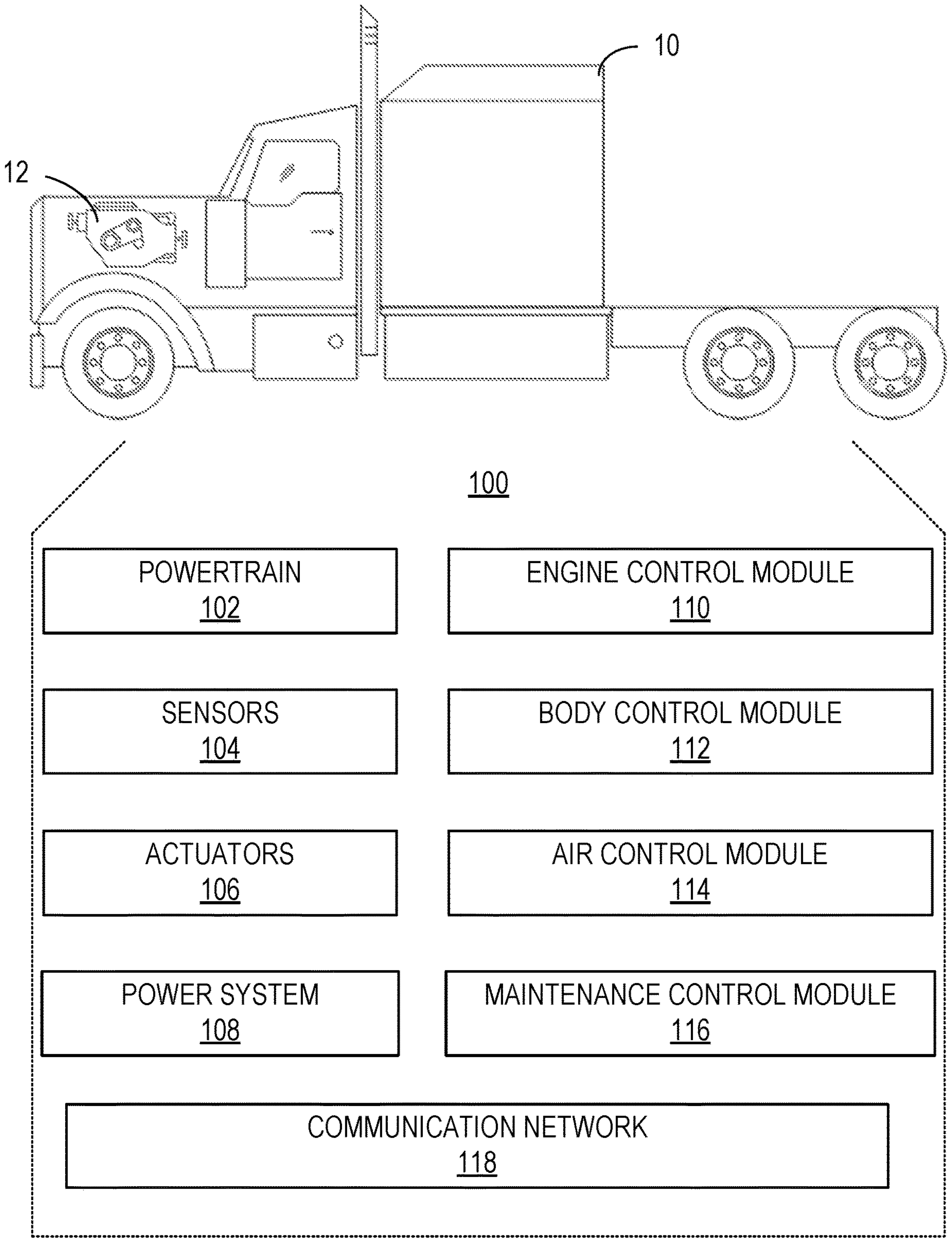
FIG. 1 is a diagram of an example system, according to embodiments described herein.

FIG. 1 illustrates an example system 100, in accordance with aspects of the present disclosure. In some embodiments, the system 100 may be part of, or incorporated into, a vehicle 10, as shown in FIG. 1. However, the vehicle 10 may include various types of automobiles, trucks, trailer tractors, utility vehicles, sport utility vehicles (SUVs), recreational vehicles (RVs), all-terrain vehicles (ATVs), as well as boats, planes, drones, trains, motor driven cycles, bicycles, and any other machines for transporting goods and/or people.

In general, the system 100 may include a vehicle powertrain 102, sensors 104, actuators 106, and a power system 108. The powertrain 104 may include a variety of components, including a vehicle engine 12, transmission, driveshaft, axle, differential, and so forth, that together create power and deliver it to wheels of the vehicle 10 to propel the vehicle 10. In some applications, the vehicle 10 is powered by an internal combustion engine. In other applications, the vehicle 10 is powered by electric power provided by one or more electric motors. In yet other applications, the vehicle 10 is powered by a combination of electric and combustion power. In yet other applications, the vehicle 10 is powered by hydrogen, propane, natural gas, and any other form of vehicle propulsion.

The sensors 104 may include a variety of sensors, including various sensing devices configured to provide data, signals, and information about the vehicle 10 and/or vehicle engine 12 operation. In some non-limiting examples, the sensors 104 may include one or more steering angle sensor, yaw rate sensor, brake pressure sensor, grade sensor, inclinometer sensor, wheel sensor, speed sensor, cruise control sensor, transmission gear sensor, load sensor, fuel sensor, airflow sensor, coolant sensor, sparkplug sensor, throttle sensor, oxygen sensor, temperature sensor, pressure sensor, voltage sensor, current sensor, and so forth.

The actuator(s) 106 may include various hardware to perform various tasks on the vehicle 10, including regulating fluid flow, moving or energizing components, controlling valves, activating switches, operating gears, and so forth, by way of hydraulic, pneumatic, magnetic or electrical activation or movement of components. In some embodiments, one or more actuators 106 may control various hardware and components on the vehicle 10, such as a fan, a heat exchanger, a heater, a valve, a pump, a switch, an electrical circuit or component, and so forth.

The power system 108 may include a variety of hardware and components, including one or more batteries, solar panels, starters, alternators, relays, converters, controllers, regulators, switches, solenoids, electrical wiring, electrical circuitry, electrical elements, and so forth. In some embodiments, the power system 108 provides power to one or more sensors 104 on the vehicle 10.

Referring again to FIG. 1, the system 100 may also include a number of control modules that perform, manage and monitor various functions of the vehicle 10. For instance, in some embodiments, the system 100 may include an engine control module (ECM) 110, a body control module (BCM) 112, an air control module 114, and a maintenance control module (MCM) 116.

The ECM 110 may control various parameters and functions of the engine 12 of the vehicle 10, including the air-fuel ratio, idle speed, valve timing, ignition timing, crankshaft position, and so forth. To this end, the ECM 110 may include any combination of analog and/or digital inputs and outputs, microprocessors, integrated circuitry, memories, clocks, Application Programming Interfaces (APIs), firmware, software, and so forth, and may communicate with various sensors 104, actuators 106, and other components on the vehicle 10.

The BCM 112 may monitor and control various vehicle body, security and convenience functions. For instance, the BCM 112 may manage exterior lighting, interior lighting, car locking, remote entry, remote start, windshield wipers, seat adjustment, tire pressure monitoring, and so forth. To this end, the BCM 112 may include various hardware, such as analog and/or digital inputs and outputs, microprocessors, integrated circuitry, programmable circuitry, clocks, batteries, APIs, and so forth, and may communicate with, monitor, and control various components on the vehicle 10.

The air control module 114 may monitor and control various functions and components associated with air flow in the vehicle 10. For instance, in some embodiments, the air control module 114 may control air intake on the vehicle 10 by operating various air control components, such as a fan, a compressor, a turbo, a valve, and so forth.

The MCM 116 may identify and report various issues related to the vehicle 10 and/or components therein, and in some embodiments, may initiate predictive maintenance. To this end, the MCM 116 may include various hardware, such as analog and/or digital inputs and outputs, microprocessors, integrated circuitry, programmable circuitry, clocks, batteries, APIs, and so forth, and may communicate with, monitor various components on the vehicle 10. In some embodiments, the MCM 116 may include a memory or a non-transitory computer-readable storage medium for storing and retrieving data, information, and executable instructions. The MCM 116 may operate independently, as well as receive instructions from, or cooperate with, various external computers, systems, or devices, including other components on the vehicle 10.

In some embodiments, the MCM 116 may receive or access signals, data, and/or information acquired using one or more sensors 104 disposed on or about the vehicle 10, including steering angle signals, data, and/or information. The MCM 116 may then process the signals, data, and/or information, determine a predictive maintenance indicator (PMI) for at least one component on the vehicle 10, where the PMI is indicative of and predict a condition of the component(s) on the vehicle 10. The PMI may include a quantitative value, such as a failure probability (e.g., between 0% and 100%), degradation rate (e.g., percentage over a period of time, etc.), remaining useful life (e.g., days, weeks, months, years, etc.), and so forth, and/or a qualitative value, such as a risk of failure (e.g., high, medium, low, etc.), and so forth. In some embodiments, the MCM 116 may determine a PMI for one or more components that relate to vehicle safety and/or drivability. For instance, components related to vehicle safety and/or drivability may be associated with steering, braking, suspension, and so forth, such as a steering shaft u-joint, steering gear box, pitman arm, drag link, tie rod, rotor, drum, shoe, pad, caliper, actuator, s-cam, slack adjuster, brake chamber, hose, fitting, modulator, relay valve, and so forth.

In some embodiments, the MCM 116 may select and process signals, data, and/or information received or accessed. For instance, the MCM 116 may select signals, data, and/or information associated with a vehicle condition or event, such as vehicle travel, vehicle steering, vehicle braking, or a combination thereof. In one non-limiting example, the MCM 116 may select steering angle data, as well as other sensor data, acquired during a braking event, acquired during a steering maneuver, acquired during a period of traveling at speed, and so forth. To this end, the MCM 116 may process other signals, data, and/or information, to determine whether such signals, data, and/or information are associated with such condition or event. For example, the MCM 116 may utilize speed data to determine that the vehicle 10 is traveling at speed, or may utilize speed and/or braking pressure data to determine that the vehicle 10 is suddenly decelerating to brake, and so forth.

In some embodiments, the MCM 116 may use a predictive maintenance correlation to determine a PMI for one or more component on the vehicle 10. The MCM 116 may access or retrieve the predictive maintenance correlation from a memory, a database, or any other storage medium associated with the vehicle 10, as well as any other source external to the vehicle 10. The predictive maintenance correlation may be in the form of a look-up table, a graph, a chart, a diagram, a model, a data structure or object, library, and so forth. The predictive maintenance correlation may relate various quantitative and/or qualitative values, data and information corresponding to various components on the vehicle 10, such as sensor values (e.g., steering angle, yaw rate, brake pressure, grade, speed, cruise control, transmission, estimated load, etc.), statistical values derived from sensor values (e.g., mean, median, variance, standard deviation, and other statistical parameters), threshold values, PMI values, diagnostic trouble code (DTC) values, dates, (e.g., date of last service, etc.), part numbers, part descriptions, descriptions, and other quantitative and/or qualitative data and information.

In some embodiments, the MCM 116 may track various quantitative and/or qualitative values, data and information over time to identify and/or predict a condition of one or more components on the vehicle 10. For instance, the MCM 116 may track steering angle over a period of time (e.g., one or more days, weeks, months, years, etc.) to determine, for example, a usage percentage, a remaining useful life, a failure probability, a failure threshold, a degradation rate and so forth, of one or more components on the vehicle 10. In some embodiments, the MCM 116 may also track occurrences of a threshold breach, for example, defined as a number of times a signal or value from a sensor, such as steering angle, exceeds one or more predetermined threshold.

In some embodiments, the MCM 116 may initiate a predictive maintenance based on the PMI determined for one or more components on the vehicle 10. For instance, the MCM 116 may generate and provide a report. The report may be in any form, and include various data and information, including various visual and/or audio signals, images, graphics, tabulated information, data, instructions (user-readable or machine-readable), graphs, lists, numbers, text, and so forth. For example, the report may indicate a condition of one or more components on the vehicle 10, may provide a maintenance or replacement recommendation or requirement for one or more components on the vehicle 10, and so forth. The report may also be in the form of a maintenance work order, or part order, and so forth. The report may be communicated to one or more users by way of a display, touchscreen, navigation system, speaker, and other outputs on the vehicle 10, as well as transmitted to various devices, systems, or third parties. For example, the report may be streamed, printed, faxed, emailed, and so forth, as well as communicated using telematics, over-the-air transmission, datalink (e.g., J1939), and other communication protocols. In some embodiments, the MCM 116 may generate and transmit the report in cooperation with various communication hardware in the communication network 118. The report may be provided in real-time, intermittently, periodically (e.g., hourly, daily, weekly, monthly, and so forth), or any combination thereof. The report may also be saved in a storage medium (e.g., a memory, a database, a server, etc.) for later access or retrieval.

In some applications, such as applications involving large fleets of vehicles, alerting and/or knowledge indicative of a need for maintaining and/or repairing component(s) may be important for scheduling and/or controlling maintenance and/or repair. Yet in some situations, certain parties (e.g., fleet maintenance directors, vice presidents, staff, and others) may have a need to control the initiation of predictive maintenance and/or alerting. For example, in some scenarios, certain parties may need to prevent, pause, clear, and/or disable an action or alert for predictive maintenance. Therefore, in some embodiments, the MCM 116 may initiate predictive maintenance based on a prior approval, as determined, for example, by accessing a memory, a database, a server, or other storage location containing approval data and/or information.

Components of the system 100 may be operatively coupled, connectable, or connected to one another, and exchange signals, data, and information, by way of a communication network 118. The communication network 118 may include a variety of hardware and components that provide wired and wireless connectivity via various communication protocols. Non-limiting examples of communication protocols include Control Area Network (CAN), Local Interconnect Network (LIN), Flex-Ray, Vehicle Area Network (VAN), Media Oriented System Transport (MOST), Bluetooth™, Wi-Fi, and so forth. In some embodiments, the communication network 118 may include one or more vehicle buses that interconnect components and hardware in the system 100. The communications network 118 may also include various gateways, bridges, receivers, transmitters, transceivers, antennas, and other components, circuitry and hardware that enable or facilitate communication.

Although specific components are shown and described with reference to FIG. 1, the system 100 may include more or fewer components, and may also integrate or separate tasks, as described. For instance, in some embodiments, the system 100 may include modules for brake control, climate control, transmission control, and so on. Also, in some embodiments, the system 100 may include a number of input/output (I/O) modules or components, such as buttons, dials, knobs, touchscreens, keyboards, monitors, screens, panels, displays, buzzers, speakers, and so forth, that can receive instructions or input from a user, and provide data, information, instructions, and other outputs to an operator or driver.

Figure 2:
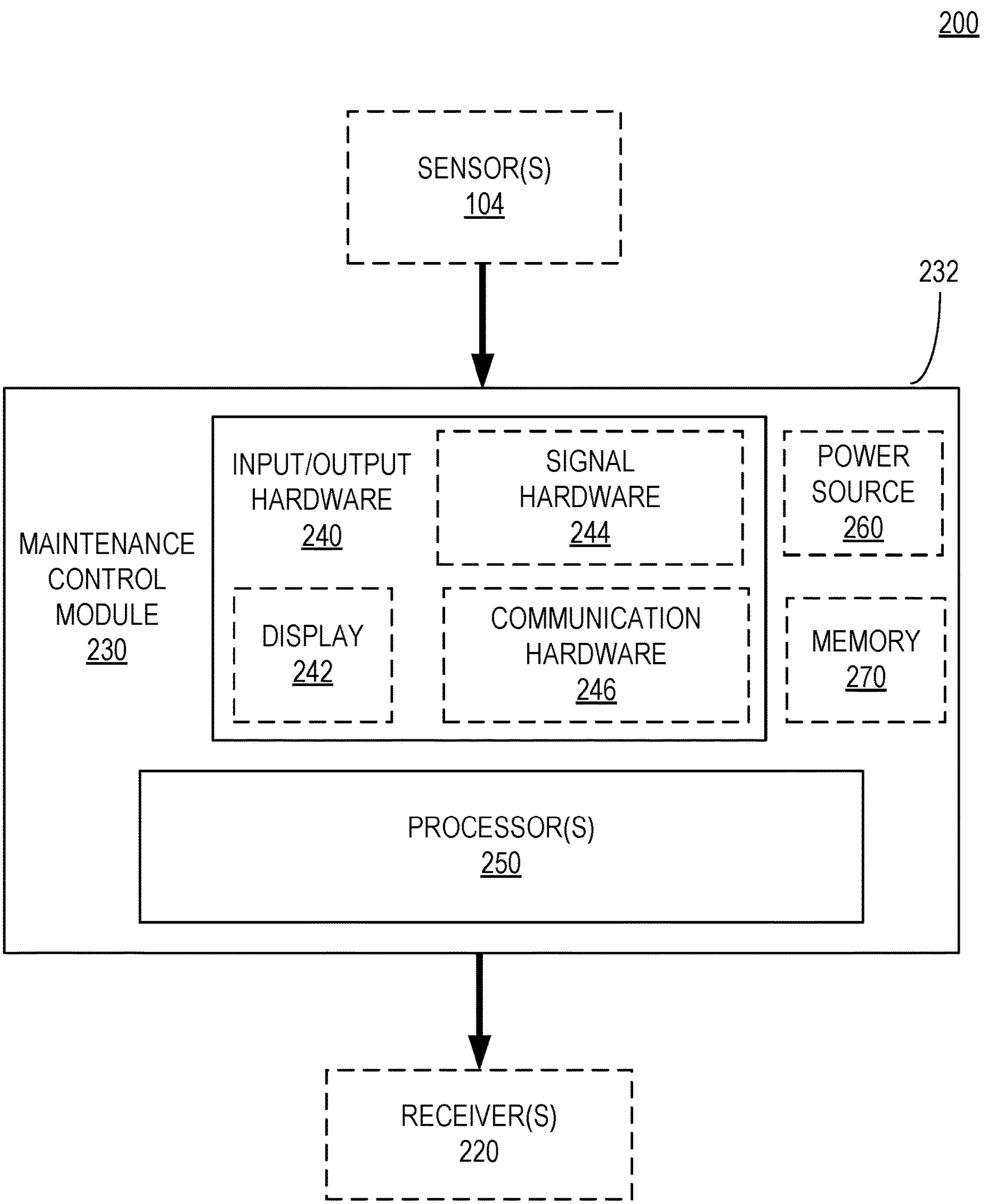
FIG. 2 is a diagram of another example system, according to embodiments described herein.

Turning now to FIG. 2, an example system 200 for predictive maintenance, in accordance with aspects of the present disclosure, is provided. The system 200 may generally include a MCM 230 with a housing 232 that may include various I/O hardware 240 and one or more processors 250. In some embodiments, the system 200 may optionally include a power source 260 and a memory 270.

The I/O hardware 240 may include various input and output elements that can receive, transmit, and provide various data, information, and instructions. Example input elements are buttons, microphones, dials, knobs, touchscreens, keyboards, connectors, and so forth. Example output elements are monitors, screens, panels, displays, buzzers, speakers, lights, and so forth. In some embodiments, the I/O hardware 240 may include a display 242 that can provide various reports, data, or information to an operator or driver. For instance, the display 242 may provide a report indicative of a condition of one or more components on a vehicle 10, as described with reference to FIG. 1, a maintenance or replacement recommendation or requirement for the component(s) on the vehicle 10, and so forth.

Although FIG. 2 shows the display 242 associated with, or part of, the housing 232 of the MCM 230, in some embodiments, the display 242 may be external to the housing 232. For instance, the display 242 may be associated with, or part of, a dashboard, a navigation system, a head-up display, a console, a readout, and so forth, on a machine, a vehicle, or any other type of equipment, and connected to the MCM 230 via I/O hardware 240. In some embodiments, the display 242 may be associated with a cloud and/or remote device, dashboard, laptop, computer, server, mainframe, and so forth.

In some embodiments, as illustrated in FIG. 2, the I/O hardware 240 may include various signal hardware 244 that can acquire, sample, transform, receive, transmit, process, and/or generate various signals, data, and information. Non-limiting examples include data loggers, recorders, signal converters (e.g., analog-to-digital, digital-to-analog, voltage, frequency, voltage-to-frequency, frequency-to-voltage, current-to-voltage, voltage-to-current etc.), signal conditioners (e.g., amplifiers, attenuators, filters, inverters, choppers, etc.), signal generators, relays, busses, switches, circuitry, interfaces, boards, clocks, and so forth. In some embodiments, the I/O hardware 240 may include various communication hardware 246 that can facilitate communication of signals, data, and information between components of the maintenance control module 230, as well as between the maintenance control module 230, and components therein, and external sensors, devices, modules, systems, and so forth. Non-limiting examples include connectors, ports, circuitry, adapters, interface cards, network cards, busses, circuitry, transmitters, receivers, transceivers, antennas, modulators, modes, and so forth.

The processor(s) 250 may carry out a variety of steps for operating the system 200, such as accessing, processing, receiving, transmitting, and/or storing various signals, data and information. To do so, the processor(s) 250 may include or utilize one or more programmable processors that can execute instructions or sequences of instructions. Such communicated to the processor(s) 250, or accessed by the processor(s) 250 from, for instance, a memory, database, or other data storage location(s). Alternatively, or additionally, the processor(s) 250 may include one or more dedicated processors, processing units, devices, modules, or systems specifically configured to (e.g., hardwired, or pre-programmed) carry out such tasks and steps. By way of example, the processor(s) 250 may include any combination of central processing units (CPUs), graphics processing units (GPUs), Digital Signal Processing (DSP) chips, Application Specific Integrated Circuits (ASICs), Field Programmable Gate Arrays (FPGAs), microprocessors, integrated circuitry, programmable circuitry, and so forth.

As illustrated in FIG. 2, the MCM 230 may optionally include a power source 260 (e.g., a battery) inside the housing 232 to power various components of the maintenance control module 230. Additionally, or alternatively, the MCM 230 may connected to and receive external power from an external source, such as a vehicle 10, as described with reference to FIG. 1. In some embodiments, the power source 260 may include various hardware for adapting, storing, and/or delivering power to various components in the maintenance control module 230.

The MCM 230 may optionally include a memory 270 for storing various data, information, and/or instructions. In some embodiments, the memory 270 may include a non-transitory computer-readable medium, such as a random access memory (RAM), a non-volatile (NV) memory, and so forth. The non-transitory computer-readable medium may store instructions for controlling lubrication, in accordance with aspects of the present disclosure.

In some embodiments, the MCM 230 may be operably coupled to, connectable to, or connected to (e.g., via wired and/or wireless connectivity) various sensors, devices, systems, computers, servers, and so forth. For instance, as illustrated in FIG. 2, the MCM 230 may be operably coupled to, connectable to, or connected to one or more sensor(s) 104, as described with reference to FIG. 1. The MCM 230 may also be operably coupled to, connectable to, or connected to one or more receivers 220, such as one or more local, cloud, and/or remote device, system, computer, server, and so forth.

In some embodiments, the processor(s) 250 may carry out steps for preventative maintenance, in accordance with the present disclosure. In some implementations, the processor(s) 250 may initiate and/or control measurement or acquisition of signals, data, or information produced by various devices or sensors, such as, signals produced by the sensor(s) 104 on the vehicle 10 described with reference to FIG. 1. For example, the processor(s) 250 may direct the signal hardware 244 to sample signals from one or more steering angle sensor, yaw rate sensor, brake pressure sensor, grade sensor, inclinometer sensor, wheel sensor, speed sensor, cruise control sensor, transmission gear sensor, load sensor, fuel sensor, airflow sensor, coolant sensor, sparkplug sensor, throttle sensor, oxygen sensor, temperature sensor, pressure sensor, voltage sensor, current sensor, and so forth, at a predetermined sampling rate, for a predetermined amount of time, at one or more predetermined times or time intervals, or any combination thereof. In some implementations, the processor(s) 250 may receive signals sampled by the signal hardware 244, may process the received signals, and/or may store the processed signals as data. For example, steering angle signals, as well as other sensor signals, sampled by the signal hardware 244 may be processed by filtering, averaging, detrending, amplifying, scaling, and so forth, and may be saved in a digital format (e.g., in memory 270, as well as elsewhere) as sensor data.

In some implementations, the processor(s) 250 may process the signals, data, and/or information, determine a predictive maintenance indicator (PMI) for at least one component on the vehicle 10, where the PMI may be indicative of a condition of the component(s) on a vehicle. As described, the PMI may include a quantitative value, such as a failure probability (e.g., between 0% and 100%), degradation rate (e.g., percentage over a period of time, etc.), remaining useful life (e.g., days, weeks, months, years, etc.), and so forth, and/or a qualitative value, such as a risk of failure (e.g., high, medium, low, etc.), and so forth. In some embodiments, the processor(s) 250 may determine a PMI for one or more components that relate to vehicle safety and/or drivability. For instance, components related to vehicle safety and/or drivability may be associated with steering, braking, suspension, and so forth, such as a steering shaft u-joint, steering gear box, pitman arm, drag link, tie rod, rotor, drum, shoe, pad, caliper, actuator, s-cam, slack adjuster, brake chamber, hose, fitting, modulator, relay valve, and so forth.

In some implementations, the processor(s) 250 may select and process signals, data, and/or information received or accessed. For instance, the processor(s) 250 may select signals, data, and/or information associated with a vehicle condition or event, such as vehicle travel, vehicle steering, vehicle braking, or a combination thereof. In one non-limiting example, the processor(s) 250 may select steering angle data, as well as other sensor data, acquired during a braking event, acquired during a steering maneuver, acquired during a period of traveling at speed, and so forth. To this end, the processor(s) 250 may process other signals, data, and/or information, to determine whether such signals, data, and/or information are associated with such condition or event. For example, the processor(s) 250 may utilize speed data to determine that a vehicle is traveling at speed, or may utilize speed and/or braking pressure data to determine that the vehicle is suddenly decelerating to brake, and so forth.

In some implementations, the processor(s) 250 may use a predictive maintenance correlation to determine a PMI for one or more component on a vehicle. For instance, the processor(s) 250 may access or retrieve the predictive maintenance correlation from a memory, a database, or any other storage medium associated with the vehicle 10 described with reference to FIG. 1, as well as any other source external to the vehicle 10. The predictive maintenance correlation may be in the form of a look-up table, a graph, a chart, a diagram, a model, a data structure or object, library, and so forth. The predictive maintenance correlation may relate various quantitative and/or qualitative values, data and information corresponding to various components, such as sensor values (e.g., steering angle, yaw rate, brake pressure, grade, speed, cruise control, transmission, estimated load, etc.), statistical values derived from sensor values (e.g., mean, median, variance, standard deviation, and other statistical parameters), threshold values, values indicative of component condition (e.g., usage percentage, remaining useful life, failure probability, failure threshold, degradation rate, etc.), DTC values, PMI values, maintenance values (e.g., date of last service, etc.), and other quantitative and/or qualitative data and information.

In some implementations, the processor(s) 250 may track various quantitative and/or qualitative values, data and information over time to identify and/or predict a condition of one or more components on the vehicle 10. For instance, the processor(s) 250 may track steering angle over a period of time (e.g., one or more days, weeks, months, years, etc.) to determine, for example, a usage percentage, a remaining useful life, a failure probability, a failure threshold, a degradation rate and so forth, of one or more components on the vehicle 10. In some embodiments, the processor(s) 250 may also track occurrences of a threshold breach, for example, defined as a number of times a signal or value from a sensor, such as steering angle, exceeds one or more predetermined threshold.

In some embodiments, the processor(s) 250 may initiate a predictive maintenance based on the PMI determined for one or more components on a vehicle. For instance, the processor(s) 250 may generate and provide a report to the receiver(s) 220. The report may be in any form, and include various data and information, including various visual and/or audio signals, images, graphics, tabulated information, data, instructions (user-readable or machine-readable), graphs, lists, numbers, text, and so forth. For example, the report may indicate a condition of one or more components a vehicle, may provide various quantitative and/or qualitative values, data and information over time (e.g., sensor values, PMI values, etc.), may provide a maintenance or replacement recommendation or requirement for one or more components on the vehicle, and so forth. The report may also be in the form of a maintenance work order, or part order, and so forth. The report may be communicated to one or more users by way of a display, touchscreen, navigation system, speaker, and other outputs on the vehicle, as well as transmitted to various devices, systems, or third parties. For example, the report may be streamed, printed, faxed, emailed, and so forth, as well as communicated using telematics, over-the-air transmission, datalink, and other communication protocols. In some embodiments, the processor(s) 250 may generate and transmit the report in cooperation with various communication hardware 246. The report may be provided in real-time, intermittently, periodically (e.g., hourly, daily, weekly, monthly, and so forth), or any combination thereof. The report may also be saved in a storage medium (e.g., a memory, a database, a server, etc.) for later access or retrieval. In some embodiments, the processor(s) 250 may initiate predictive maintenance based on a prior approval, as determined, for example, by accessing a memory, a database, a server, or other storage location containing approval data and/or information.

Figure 3:
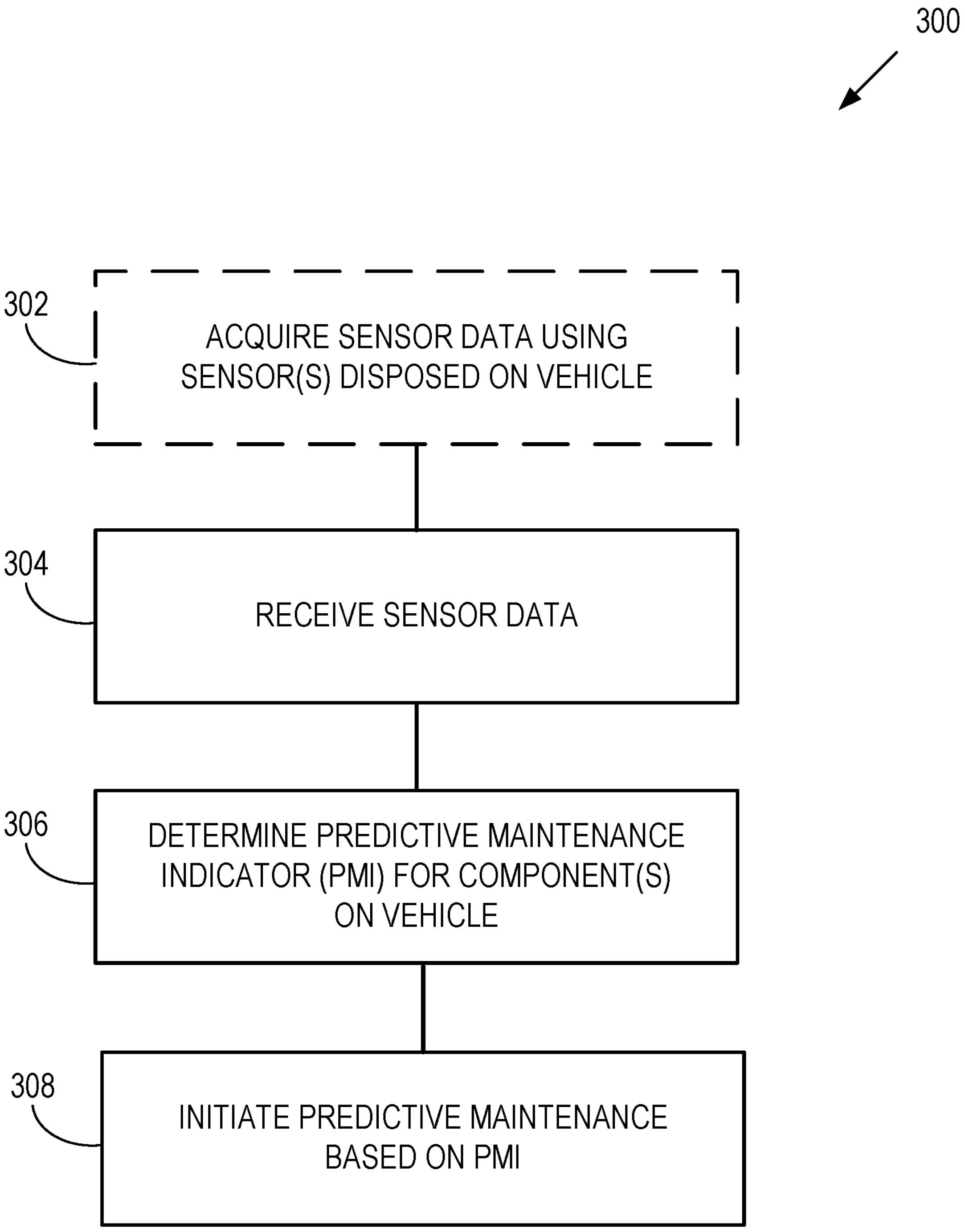
FIG. 3 is a flowchart setting forth steps of a process, according to embodiments herein.

Turning now to FIG. 3, a flowchart setting forth steps of a process 300, in accordance with aspects of the present disclosure, is illustrated. Steps of the process 300 may be carried out using any combination of suitable devices or systems, as well as using systems described in the present disclosure. In some embodiments, steps of the process 300 may be implemented as instructions stored in non-transitory computer readable media, as a program, firmware or software, and executed by a general-purpose, programmed or programmable, computer, processor, or any other computing device. In other embodiments, steps of the process 300 may be hardwired in an application-specific computer, processer, or dedicated system or module as described with reference to FIGS. 1 and 2. Although the process 300 is illustrated and described as a sequence of steps, it is contemplated that the steps may be performed in any order or combination. The process 300 need not include all of the illustrated steps, and in some implementations may include other or additional steps.

The process 300 may optionally begin at process block 302 with acquiring sensor data using sensors, such as sensors disposed on a vehicle 10 as described with reference to FIG. 1. The sensors may include one or more steering angle sensor, yaw rate sensor, brake pressure sensor, grade sensor, inclinometer sensor, wheel sensor, speed sensor, cruise control sensor, transmission gear sensor, load sensor, fuel sensor, airflow sensor, coolant sensor, sparkplug sensor, throttle sensor, oxygen sensor, temperature sensor, pressure sensor, voltage sensor, current sensor, and so forth. As such, steering angle data, speed data, brake pressure data, and so forth, may be acquired at process block 302.

Sensor data acquired by the sensor(s) may then be received, as indicated by process block 304. In some implementations, sensor data may be received concomitant with measurement. For instance, real-time signals output by various sensors, devices, or other signal detection hardware, may be sampled at a predetermined rate, for a predetermined amount of time, at one or more predetermined times or time intervals, or any combination thereof, for example, using signal hardware 244 described with reference to FIG. 2. In some implementations, sensor data may be received at process block 304 by accessing data from a storage medium. For example, the MCM 250 may receive steering angle data, and other data, from the memory 270.

In some implementations, signals received at process block 304 may also be processed, for example, by filtering, averaging, detrending, amplifying, scaling, and so forth. Raw and/or processed signals may also be saved in a digital format (e.g., in memory 270, as well as elsewhere) as sensor data. In some implementations, other data, or information may be acquired, received, or accessed at process blocks 302, 304, such as data and information related to a vehicle and/or one or more component therein, data and information related to one or more operating conditions of the vehicle 10 and/or component(s), and so forth.

Then, at process block 306, a PMI associated with one or more components on a vehicle may be determined using sensor data received at process block 304. To determine the PMI, a predictive maintenance correlation may be used, as described. The predictive maintenance correlation may be accessed or retrieved from a memory, a database, or any other storage medium. As described, the predictive maintenance correlation may be in the form of a look-up table, a graph, a chart, a diagram, a model, a data structure or object, library, and so forth. The predictive maintenance correlation may relate various quantitative and/or qualitative values, data and information corresponding to various components on a vehicle, such as sensor values (e.g., steering angle, yaw rate, brake pressure, grade, speed, cruise control, transmission, estimated load, etc.), statistical values derived from sensor values (e.g., mean, median, variance, standard deviation, and other statistical parameters), threshold values, values indicative of component condition (e.g., usage percentage, remaining useful life, failure probability, failure threshold, degradation rate, etc.), diagnostic trouble code (DTC) values, maintenance values (e.g., date of last service, etc.), PMI values, and other quantitative and/or qualitative data and information.

In some implementations, certain signals, data, and/or information received or accessed received at process block 304 may be selectively processed to determine the PMI for the component(s). For instance, signals, data, and/or information associated with a vehicle condition or event, such as vehicle travel, vehicle steering, vehicle braking, or a combination thereof, may be selected and processed. For example, steering angle data, as well as other sensor data, acquired during a braking event, acquired during a steering maneuver, acquired during a period of traveling at speed, and so forth, may be selected and processed. As described, this step may include processing other signals, data, and/or information, to determine whether such signals, data, and/or information are associated with such condition or event. For example, speed data may be utilized to determine that a vehicle is traveling at speed, or speed and/or braking pressure data may be utilized determine that the vehicle is suddenly decelerating to brake. In some implementations, one or more diagnostic trouble code may be generated based on the PMI.

The predictive maintenance correlation used at process block 306 may be stored in, and accessed from, a memory or other storage location associated with the specific vehicle, machine, equipment, or component thereof. For example, in some implementations, a predictive maintenance correlation may be stored in memory 270 described with reference to FIG. 2. In other implementations, a predictive maintenance correlation may be programmed or hardwired in a processor, module, device, hardware, and so forth, via firmware, software, and so forth, such as MCM 116 described with reference to FIG. 1.

In some implementations, various quantitative and/or qualitative values, data and information may be tracked over time to determine the PMI for one or more component at process block 306. For instance, steering angle may be tracked over a period of time (e.g., one or more days, weeks, months, years, etc.) to determine, for example, a usage percentage, a remaining useful life, a failure probability, a degradation rate, risk of failure, and so forth, of the component(s). Also, occurrences of certain events, such as a number of times a sensor value, such as steering angle, exceeds one or more predetermined threshold may also be tracked at process block 306 to determine the PMI for one or more component.

Figure 4:
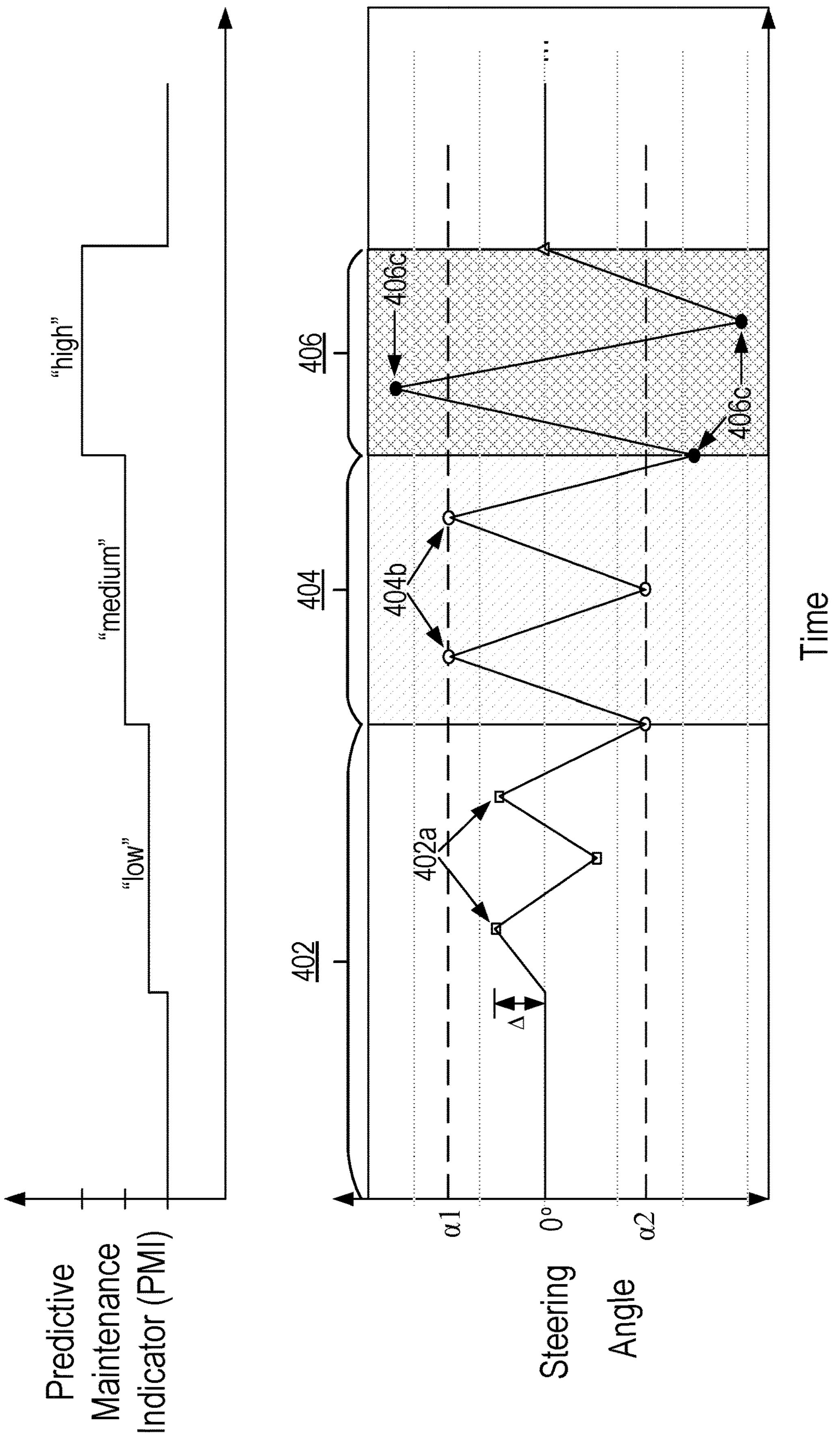
FIG. 4 is a graphical illustration showing an example predictive maintenance correlation, according to embodiments herein.

By way of example, FIG. 4 shows an example predictive maintenance correlation illustrating a relationship between steering angle and PMI for a component on a vehicle. As shown, steering angle values, for example, acquired using one or more steering angle sensors disposed on the vehicle, may evolve over time as various components on the vehicle wear out. In a first stage 402, steering angle values 402*a* (illustrated in FIG. 4 using open squares) may remain between a first steering angle threshold $\alpha$1 and a second steering angle threshold $\alpha$2, and indicate, for instance, a good working condition for one or more components on the vehicle. In a second stage 404, steering angle values 404*b* (illustrated in FIG. 4 using open circles) may reach the first steering angle threshold $\alpha$1 and/or the second steering angle threshold $\alpha$2. In a third stage 406, steering angle values 406*c* (illustrated in FIG. 4 using filled-in circles) may exceed the first steering angle threshold $\alpha$1 and/or the second steering angle threshold $\alpha$2. Reaching or exceeding the threshold(s) in the second stage 404 and the third stage 406 may be indicative of a poor or less than optimal working condition for one or more components on the vehicle, and hence, a need for maintenance. Values for the first steering angle threshold $\alpha$1 and the second steering angle threshold $\alpha$2 may be the same or different.

As described, variation $\Delta$ of steering angle values over time from a neutral value (e.g.,) 0° may be used to determine PMI for one or more components on the vehicle. For example, as illustrated in FIG. 4, a "low" PMI may correspond to steering angle values 402*a* in the first stage 402. A "medium" PMI may correspond to steering angle values 404*b* in the second stage 404, and a "high" PMI may correspond to steering angle values 406*c* in the second stage 406. In some implementations, for example, a "high" PMI may indicate a more urgent need of maintenance or repair compared to a "medium" PMI. After maintenance and/or repair activity, steering angle values may return to the neutral value (illustrated in FIG. 4 using an open triangle). While FIG. 4 shows one example relationship between PMI and steering angle values, such relationships may vary depending on the component of the vehicle, operating conditions of the vehicle, and so forth. For example, steering angle and PMI may relate more strongly, or less strongly, for a suspension component compared to a braking component.

Referring again to FIG. 3, a predictive maintenance based on the PMI determined at process block 306 for one or more components on a vehicle may be initiated at process block 308. For instance, in some implementations, an action to maintain and/or repair the component(s) may be taken. In other implementations, a report may be generated and provided at process block 308 to initiate the predictive maintenance and/or alert for a need to maintain and/or repair the component(s). The report may be in any form, and include various data and information, including various visual and/or audio signals, images, graphics, tabulated information, data, instructions (user-readable or machine-readable), graphs, lists, numbers, text, and so forth. For example, the report may indicate a condition of one or more components on the vehicle, may provide a maintenance or replacement recommendation or requirement for one or more components on the vehicle, and so forth. In other examples, the report may be in the form of a maintenance work order, or part order, and so forth. The report may be communicated to one or more users by way of a display, touchscreen, navigation system, speaker, and other outputs on the vehicle, as well as transmitted to various devices, systems, or third parties. For example, the report may be streamed, printed, faxed, emailed, and so forth, as well as communicated using telematics, over-the-air transmission, datalink, and other communication protocols. The report may be provided in real-time, intermittently, periodically (e.g., hourly, daily, weekly, monthly, and so forth), or any combination thereof. The report may be alternatively or additionally saved in a storage medium (e.g., a memory, a database, a server, etc.) for later access or retrieval.

In some implementations, the initiation of the predictive maintenance at process block 308 may depend on certain conditions being satisfied. For instance, a report may not be generated and/or provided to a receiver without a prior approval, as determined, for example, by accessing a memory, a database, a server, or other storage location containing approval data and/or information.

As described, the present approach affords a number of advantages, including predictive maintenance that may help avoid catastrophic failures or premature wear, limit or reduce unplanned downtime events, and so forth. In addition to alerting for potential risk, the present approach may also provide driver assistance by reducing or eliminating reliance on subjective evaluation or diagnosis in favor of a data-driven approach. Other advantages may also include reduction in fatigue. For instance, a driver may experience peripheral fatigue while controlling a vehicle over a driving shift due to, for example, vibrations in a steering wheel. Analyzing steering angle, and other, data and initiating predictive maintenance for one or more components on the vehicle, in accordance with the present approach, may help reduce or eliminate vibrations contributing to peripheral fatigue.

According to one embodiment, a method for predictive maintenance is provided. The method comprises steps of receiving sensor data acquired using at least one sensor disposed on a vehicle, the sensor data comprising steering angle data, and using the steering angle data, determining a predictive maintenance indicator (PMI) for at least one component on the vehicle. The method also comprises steps of initiating a predictive maintenance for the at least one component on the vehicle based on the PMI. In one embodiment, the method further comprises selecting steering angle data associated with vehicle travel, vehicle steering, vehicle braking, or a combination thereof. In another embodiment, the method further comprises obtaining a predictive maintenance correlation from a memory associated with the vehicle, and determining the PMI using the predictive maintenance correlation. In yet another embodiment, the method further comprises obtaining the predictive maintenance correlation in the form of a look-up table, a graph, a chart, a diagram, a model, a data structure, a data object, a library, or a combination thereof, wherein the predictive maintenance correlation relates at least steering angle and PMI values for the at least one vehicle component on the vehicle. In yet another embodiment, the method further comprises tracking the steering angle over a period of time to determine the PMI for the at least one vehicle component. In yet another embodiment, the method further comprises detecting at least one occurrence of the steering angle exceeding at least one predetermined steering angle threshold. In yet another embodiment, the method further comprises generating a diagnostic trouble code based on the PMI. In yet another embodiment, the method further comprises generating a report indicative of the maintenance requirement for the vehicle.

According to another embodiment, a system for predictive maintenance for a vehicle is provided. The system comprises input hardware operably coupled to at least one sensor disposed on a vehicle to receive sensor data acquired by the at least one sensor, the sensor data comprising steering angle data. The system also comprises at least one processor connected to the input hardware, wherein the at least one processor receives steering angle data from the input hardware, using the steering angle data, determines a predictive maintenance indicator (PMI) for at least one component on the vehicle, and generates, based on the PMI, a report to initiate a predictive maintenance for at least one component on the vehicle. The system further comprises output hardware that communicates the report to a receiver. In one embodiment, the at least one processor further selects steering angle data associated with vehicle travel, vehicle steering, vehicle steering, vehicle braking, or a combination thereof. In another embodiment, the at least one processor further obtains a predictive maintenance correlation from a memory associated with the vehicle, and determines the PMI using the predictive maintenance correlation, wherein the predictive maintenance correlation relates at least steering angle and PMI values for the at least one vehicle component on the vehicle. In yet another embodiment, the at least one processor further utilizes the steering angle data to determine whether a steering angle is within a predetermined steering angle range or whether the steering angle exceeds at least one predetermined steering angle threshold. In yet another embodiment, the at least one processor further tracks the steering angle over a period of time to determine the PMI for the at least one vehicle component. In yet another embodiment, the at least one processor further generates a diagnostic trouble code based on the PMI for the at least one vehicle component. In yet another embodiment, the at least one processor further generates a report that indicates a condition of the at least one vehicle component.

While the present disclosure has described a number of embodiments and implementations, the disclosure is not so limited but covers various obvious modifications and equivalent arrangements, which fall within the purview of the appended claims. Although certain features are expressed in certain combinations among the claims, it is contemplated that these features can be arranged in any combination and order. It should be appreciated that many equivalents, alternatives, variations, and modifications, aside from those expressly stated, are possible.

The invention claimed is:

1. A vehicle comprising:

a braking system;

a suspension system;

a steering system comprising a steering wheel rotatable in response to a selective steering input of a human driver, wherein said steering, braking and suspension systems comprise at least one component related to vehicle safety and drivability; and at least one steering angle sensor to continuously measuring an angular position of the steering wheel and outputting steering angle data corresponding to said measured angular position;

a maintenance control module (MCM) operably connected to said at least one steering angle sensor, the MCM comprising at least one processor and memory, the memory comprising instructions to cause the processor to:

receive said measured steering angle data;

using the steering angle data, determine a predictive maintenance indicator (PMI) for said at least one component on the vehicle by using a vehicle-specific predictive maintenance correlation stored in the MCM to compare variations in the measured steering angle data over time from a neutral value to predetermined threshold values, thereby predicting wear or failure of said at least one component affecting vehicle safety and drivability;

generate a diagnostic trouble code (DTC) and a maintenance report; and transmit, using output hardware, the maintenance report and DTC to a user or a remote service location for initiating maintenance actions, said maintenance report including the PMI, an urgency level associated with the PMI and at least one recommended maintenance action to repair or replace said at least one component for which the PMI was determined, thereby returning steering angle values to said neutral value.

2. The vehicle of claim 1 wherein the MCM is further configured to select steering angle data associated with vehicle travel, vehicle steering, vehicle braking, or a combination thereof.

3. The vehicle of claim 1 wherein the MCM is further configured to obtain the predictive maintenance correlation in the form of a look-up table, a graph, a chart, a diagram, a model, a data structure, a data object, a library, or a combination thereof.

4. The vehicle of claim 1 wherein the MCM is further configured to track the steering angle over a period of time to determine the PMI for the at least one vehicle component.

5. The vehicle of claim 4 wherein the MCM is further configured to detect at least one occurrence of the steering angle exceeding at least one predetermined steering angle threshold.

6. A vehicle comprising:

a braking system;

a suspension system;

a steering system comprising a steering wheel rotatable in response to a selective steering input of a driver, wherein said steering, braking and suspension systems comprise at least one component related to vehicle safety and drivability;

at least one steering angle sensor to continuously measure an angular position of the steering wheel and output steering angle data corresponding to said measured angular position;

input hardware operably coupled to said at least one steering angle sensor to receive the measured steering angle data; and a maintenance control module (MCM) connected to the input hardware, wherein the MCM comprises at least one processor and memory to receive said measured steering angle data from the input hardware; apply the measured steering angle data to a vehicle-specific maintenance model stored in the memory, the model comprising a correlation between steering angle data and component threshold values; determine a predictive maintenance indicator (PMI) for said at least one component on the vehicle associated with the at least one steering angle sensor based on deviations in the measured steering angle data over time from a neutral value, thereby predicting wear or failure of said at least one component affecting vehicle safety and drivability; and generate a diagnostic trouble code (DTC) and a maintenance report; and output hardware configured to transmit the maintenance report and DTC to a user or a remote service location, said maintenance report including the PMI, an urgency level associated with the PMI and at least one recommended maintenance action to repair or replace said at least one component for which the PMI was determined to return steering angle values to said neutral value.

7. The vehicle of claim 6, wherein the at least one processor further selects steering angle data associated with vehicle travel, vehicle steering, vehicle braking, or a combination thereof.

8. The vehicle of claim 1, wherein the urgency level is based on the deviation from expected steering angle values.

9. The vehicle of claim 1, wherein the MCM may initiate predictive maintenance based on a prior approval by as user.

* * * * *